(12) United States Patent  
Weiner et al.

(10) Patent No.: US 9,189,807 B2  
(45) Date of Patent: Nov. 17, 2015

(54) IN-NETWORK ONLINE STORAGE WITH INCREASED SESSION BANDWIDTH

(75) Inventors: Fred Scott Weiner, Atlanta, GA (US); Leah P'Simer, Dunwoody, GA (US); Charles Scarborough, Marietta, GA (US); Stuart Cassell, Marietta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 12/466,863

(22) Filed: May 15, 2009

(65) Prior Publication Data

US 2010/0180034 A1    Jul. 15, 2010

Related U.S. Application Data

(60) Provisional application No. 61/144,967, filed on Jan. 15, 2009.

(51) Int. Cl.
| | |
|---|---|
| *G06Q 30/04* | (2012.01) |
| *H04L 29/08* | (2006.01) |
| *G06F 9/50* | (2006.01) |
| *G06F 3/06* | (2006.01) |

(52) U.S. Cl.  
CPC ............ *G06Q 30/04* (2013.01); *H04L 67/1097* (2013.01); *G06F 3/067* (2013.01); *G06F 9/5072* (2013.01)

(58) Field of Classification Search  
CPC ............ H04L 41/5003; H04L 41/5006; H04L 41/5009; H04L 41/5022; H04L 41/5051

USPC .......................................... 709/226, 227, 229  
See application file for complete search history.

(56) References Cited

U.S. PATENT DOCUMENTS

| | | | | |
|---|---|---|---|---|
| 5,812,545 | A * | 9/1998 | Liebowitz et al. | 370/337 |
| 5,901,228 | A * | 5/1999 | Crawford | 705/34 |
| 6,230,203 | B1* | 5/2001 | Koperda et al. | 709/229 |
| 6,738,348 | B1* | 5/2004 | Rollins | 370/230 |
| 7,072,968 | B2 | 7/2006 | Mikami et al. | 709/229 |
| 7,768,920 | B2* | 8/2010 | Goshen et al. | 370/235 |
| 7,912,001 | B2 | 3/2011 | Wright | 370/329 |
| 2001/0044845 | A1 | 11/2001 | Cloonan et al. | |
| 2002/0065907 | A1 | 5/2002 | Cloonan et al. | 709/223 |
| 2002/0099669 | A1 | 7/2002 | Lauer | |

(Continued)

OTHER PUBLICATIONS

"Comcast Unleashes Its Innovative Powerboost™ Technology on Upstream Speed", http://comcastcalifornia.mediaroom.com/index.php?s=43&item=170, Aug. 22, 2007.*

(Continued)

*Primary Examiner* — Joe Chacko  
(74) *Attorney, Agent, or Firm* — Merchant & Gould P.C.

(57) ABSTRACT

A system includes a private communications network to provide content to a user using a first, base amount of bandwidth, a policy server, coupled to the network, for managing services provided to a user of the communications network and a data center, coupled to the network, for providing online storage to the user by the communications network, wherein the first, base bandwidth of the communication network is increased to a second, increased bandwidth for a data upload made by the user. The use of a private network addresses the security and efficiency issues of transmitting data over a public network and increased bandwidth enables data transmission between a user and a data center to be completed in a timely manner.

18 Claims, 7 Drawing Sheets

(56) References Cited

U.S. PATENT DOCUMENTS

| | | | |
|---|---|---|---|
| 2002/0188732 A1* | 12/2002 | Buckman et al. | 709/228 |
| 2003/0056063 A1* | 3/2003 | Hochmuth et al. | 711/152 |
| 2004/0199635 A1* | 10/2004 | Ta et al. | 709/226 |
| 2005/0020243 A1 | 1/2005 | Benco et al. | 455/406 |
| 2005/0021621 A1* | 1/2005 | Welch et al. | 709/204 |
| 2005/0021739 A1* | 1/2005 | Carter et al. | 709/224 |
| 2005/0071182 A1 | 3/2005 | Aikens et al. | |
| 2005/0083845 A1* | 4/2005 | Compton et al. | 370/235 |
| 2005/0198682 A1 | 9/2005 | Wright | |
| 2006/0120385 A1* | 6/2006 | Atchison et al. | 370/400 |
| 2007/0002897 A1* | 1/2007 | Goshen et al. | 370/468 |
| 2007/0208826 A1* | 9/2007 | Devolites | 709/219 |
| 2008/0253545 A1* | 10/2008 | Gleichauf | 379/201.12 |
| 2009/0083433 A1* | 3/2009 | Liu | 709/231 |
| 2011/0317717 A1* | 12/2011 | Scarborough | 370/468 |

OTHER PUBLICATIONS

Office Action mailed Dec. 21, 2010, in co-pending U.S. Appl. No. 12/851,769.

Office Action mailed Jul. 11, 2011, in co-pending U.S. Appl. No. 12/851,769.

Office Action mailed Jul. 6, 2012, in co-pending U.S. Appl. No. 12/851,769.

Baumgartner, Jeff, "Buckeye launches bandwidth-on-demand", Jan. 18, 2006, CED magazine, http://www.cedmagazine.com/news/2006/01/buckeye-launches-bandwidth-on-demand, 4 pages.

Office Action mailed Jan. 24, 2013 in co-pending U.S. Appl. No. 12/851,769.

Office Action mailed Jan. 31, 2014 in co-pending U.S. Appl. No. 12/851,769.

Office Action mailed Jun. 23, 2014 in U.S. Appl. No. 12/851,769, 27 pgs.

Office Action mailed Jan. 14, 2015 in U.S. Appl. No. 12/851,769, 28 pgs.

Office Action mailed Jul. 21, 2015 in U.S. Appl. No. 12/851,769, 23 pgs.

* cited by examiner

IN-NETWORK ONLINE STORAGE WITH INCREASED SESSION BANDWIDTH

CROSS REFERENCE TO RELATED APPLICATIONS

The present application claims priority to U.S. Provisional Application No. 61/144,967 filed Jan. 15, 2009 entitled "In-Network Online Storage With Increased Session Bandwidth," which is hereby incorporated by reference.

FIELD OF THE INVENTION

This disclosure relates in general to online storage, and more particularly to providing secure and efficient data transport between a user and online storage.

BACKGROUND

Recently, there has been increased pressure to protect, store, and efficiently share data. This increased pressure has facilitated the growth of the storage-as-a-service market. Key players in this technological area are known as storage service providers (SSPs). Analysts predict that the compounded annual growth rate (CAGR) of online backup services will increase by dramatically in the coming years. As small-to-medium businesses anticipate the need for storage capacity to grow annually, the cost for such businesses to procure, power, and manage their own "data warehouses" becomes prohibitive.

In the hours following any catastrophic network failure of any scale, every business no matter the size could see the benefit of a remote, geographically diverse data backup, storage and restoration service. Particularly vulnerable is the small-to-medium businesses space whose managers may not be fully aware of the risk factors, have the technical expertise, time, or budget to implement their own solution.

Moreover, as the amount of digital data generated annually continues to climb, consumption of external disk capacity used for traditional business data, replicated data, and fixed content combined is expected to expand rapidly. Investments in new technology are focused on gaining efficiencies. However, for the small business the increasing amount of storage required can quickly render brand new hardware at the server and the end-user PC level obsolete. Scalable, and with the ability to increase capacity as the customer's business needs grow, online storage would allows the customer to get more out of their hardware technology investment. The customer would no longer has to contract with an information technology (IT) consultant, procure replacement drives or undergo risky data migrations when the storage space on their hardware reaches capacity.

In the fixed content category alone, small businesses can save many thousands annually by making their product catalogs, brochures, digital photographs, and customer deliverables available for secure download to anyone they grant access. For the small business, saving the ever increasing cost of paper, printing, postage, and overnight couriers makes them more competitive in the marketplace, contributes directly to their bottom line, and for the small business it can make the difference between seeing red and black.

Looking closer at the traditional methods of distribution, beside cost savings an added benefit would be that each time they share these items via their secure server space versus traditional methods the customer would be doing their part in becoming more environmentally responsible. This environmentally responsible approach would be especially appealing to the communities and a great number of customers they serve as the customer would be reducing the "carbon footprint" of their products. The carbon footprint is the amount of carbon dioxide and other greenhouse gases that are produced and released into the atmosphere when the goods are made, shipped and stored, and then used by consumers.

SUMMARY OF THE INVENTION

To overcome the limitations described above, and to overcome other limitations that will become apparent upon reading and understanding the present specification, embodiments for in-network online storage with increased session bandwidth are disclosed.

The above-described problems are solved by providing a private network to address the security and efficiency issues of transmitting data over a public network. Increased bandwidth is utilized to enable data transmission between a user and a data center to be completed in a timely manner.

An embodiment includes a method for providing online storage that includes providing, by a user, a request for initiating a data upload over a private communications network to online storage at a data center, processing the request for initiating a data upload to identify an additional amount of bandwidth beyond a base level of bandwidth to provide the user and providing, to the user, the additional amount of bandwidth beyond the base level of bandwidth for the data upload to the data center.

In another embodiment, a system for providing online storage is provided. The system includes a private communications network to provide content to a user using a first, base amount of bandwidth, a policy server, coupled to the network, for managing services provided to a user of the communications network and a data center, coupled to the network, for providing online storage to the user by the communications network, wherein the first, base bandwidth of the communication network is increased to a second, increased bandwidth for a data upload made by the user.

A computer readable medium including executable instructions which, when executed by a processor, provides online storage by forwarding a request by a user for initiating a data upload over a private communications network to online storage at a data center, processing the request for initiating a data upload to identify an additional amount of bandwidth beyond a base level of bandwidth to provide the user and modifying the bandwidth of the private network to provide to the user the additional amount of bandwidth beyond the base level of bandwidth for the data upload to the data center.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to in-network online storage with increased session bandwidth.

Figure 1:
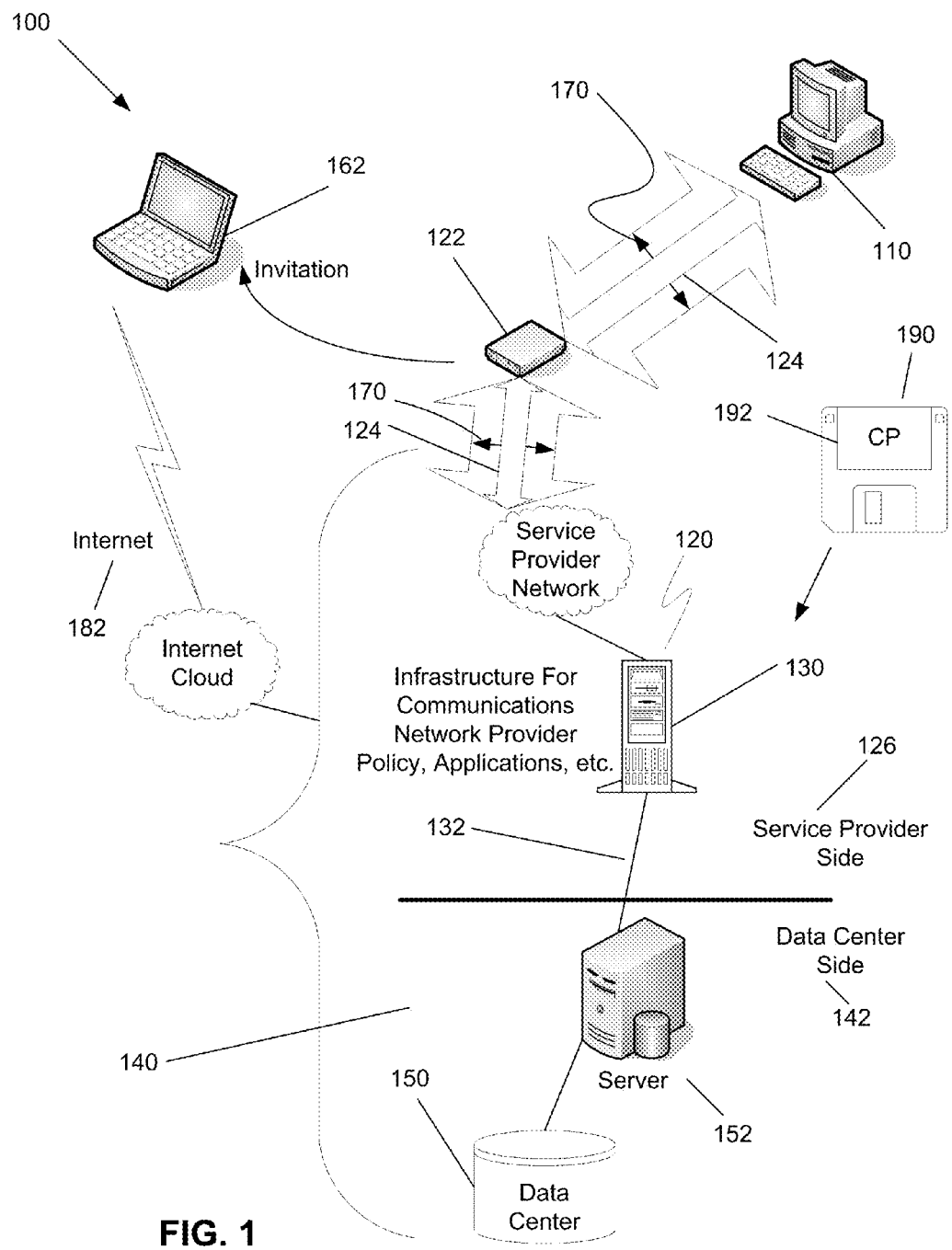
FIG. 1 is a block diagram of a system providing in-network online storage with increased session bandwidth according to an embodiment of the invention.

FIG. 1 is a block diagram of a system 100 providing in-network online storage with increased session bandwidth according to an embodiment of the invention. In FIG. 1, a customer 110 is coupled to a communications network provider 120, such as a cable operator, through an interface device 122, such as a router or cable modem. Most operations performed by the user are performed employing a first predetermined bandwidth 124. For example, the first predetermined bandwidth 124 may be used for browsing the Internet, VoIP calls, content download and other typical online activity. The communications network provider 120 controls the amount of bandwidth using policy servers 130 that allocate bandwidth according to contractual arrangements with the user. The communications network provider 120 provides and maintains their own network for providing content and/or data to users 110. The communications network provider 120 may provide cable programming, movies-on-demand and other services/content over the network. The communications network provider 120 may also provide the user access to the Internet via the network.

One service that the communications network provider 120 may also provide involves allowing the user to access a data center 140 to store data remotely for archival, backup and remote access. Control of the data center 140, including the actual storage devices/systems 150 may be provided by a server 152. The data center 140 may be provided and maintained by the communications network provider 120 or may be out-sourced to a storage vendor, i.e., a storage vendor may be coupled from a data center side 142 to a communications network provider side 126. Nevertheless, the communications network provider 120 and the data center 140 communicate to facilitate data uploads and data restores. When the data center 140 is provided by a storage vendor, a secure connection with the communications network provider 120 is established. Thus, when the user 110 uploads data to the data center 140 through the interface device 122, the data traverses only the network of the communications network provider 120 and the secure connection 132 between the communications network provider 120 and the data center 140. This transaction will herein be referred to as "in-network."

All ingress and egress data traffic to the primary and/or secondary data center 130 will traverse only the private network of the communications services provider 120. This greatly reduces potential packet loss, latency, additional network hops, and carriage fees typically inherent with normal Internet traffic. The greater the number of hops, the more points of failure and the more time it takes for data to traverse the path to its destination. Thus, the packet loss, the latency, the network hops, and the security risk inherent with any data bouncing around the Internet is eliminated when the data stays on the network of the communications network provider 120.

The online data backup service may also be configured to provide remote drive capabilities where a customer utilizes the system as a secure and remote network drive. In such a transaction, the user may send an invitation 160 to remote computer 162, e.g., a co-worker, associate, customer, etc., to indicate the user at the remote computer 162 may download designated files, including very large files. The invitation 160 may be sent to other users at large without having to grant each user access to the secure drive. To provide security, strong administrative tools may be used to provide customers the ability to manage data restore, drive segmentation, user access levels, and read/write permissions from anywhere, at anytime.

Because a data upload from a user 110 to the data center 140 may be bandwidth intensive, a boost 170 in bandwidth may be provided by the communications network provider. However, only when the user is on the network of the communications network provider will the system recognize an upload and provide the bandwidth boost. When a customer orders the service, necessary information, such as the user rate code, is loaded to the system 130 of the communications network provider 120. The information is used to establish eligibility of the user for backup service. Once eligibility is established, the appropriate amount of storage is provisioned for a user 110 at the data center 140.

Not all uploads will trigger a bandwidth boost for the user. Only an upload request to a specific provisioned data store at the data center 140 will trigger the bandwidth boost 170. For example, when a user 110 at an approved IP address makes a request, the policy server 130 will authenticate the IP address and authorize an upload to a specific provisioned server using additional allocated bandwidth 170. The additional allocated bandwidth 170 is provided for the duration of the upload.

The amount of storage provisioned to the user 110 on the storage devices/systems 150 and the amount of bandwidth boost 170 available to the user 110 for data transfers with the data center 140 may be dictated by service level agreements. Data may also be made available to the user online at any location. For example, FIG. 1 shows a user 162 accessing the data center 140 via the Internet 182. However, this type of transaction is not an "in-network" transaction and thus is not characterized by the security afforded an "in-network" transaction. When data is routed over public networks, the data may be encrypted, but will still traverse the public network thereby allowing possible interception where the encryption theoretically may be broken. In addition, the bandwidth boost 170 is not afforded the remote user.

Embodiments may be implemented in a suitable computing environment. Embodiments may also be implemented in combination with other types of computer systems and program modules. Generally, program modules include routines, programs, components, data structures, and other types of structures that perform particular tasks or implement particular abstract data types. By way of example, computer readable media 190 can include computer readable storage media and communication media. Computer readable storage media 190 includes volatile and nonvolatile, removable and non-removable media implemented in any method or technology for storage of information 192, such as computer readable instructions, data structures, program modules or other data. Computer readable storage media 190 typically embodies computer readable instructions, data structures, and program modules stored thereon. Communication media includes a modulated data signal such as a carrier wave or other transport mechanism. The term "modulated data signal" means a signal that has one or more of its characteristics set or changed in such a manner as to encode information in the signal. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both the communications network provider 120 and the data center 140.

Embodiments implemented on computer-readable media 190 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 190 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a processing device.

As mentioned briefly above, a number of program modules and data files may be stored and arranged for controlling the operation of processing devices. Thus, processing devices, such as server 152, storage devices/systems 150 and the infrastructure 130 of the communications network provider 120, may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Figure 2:
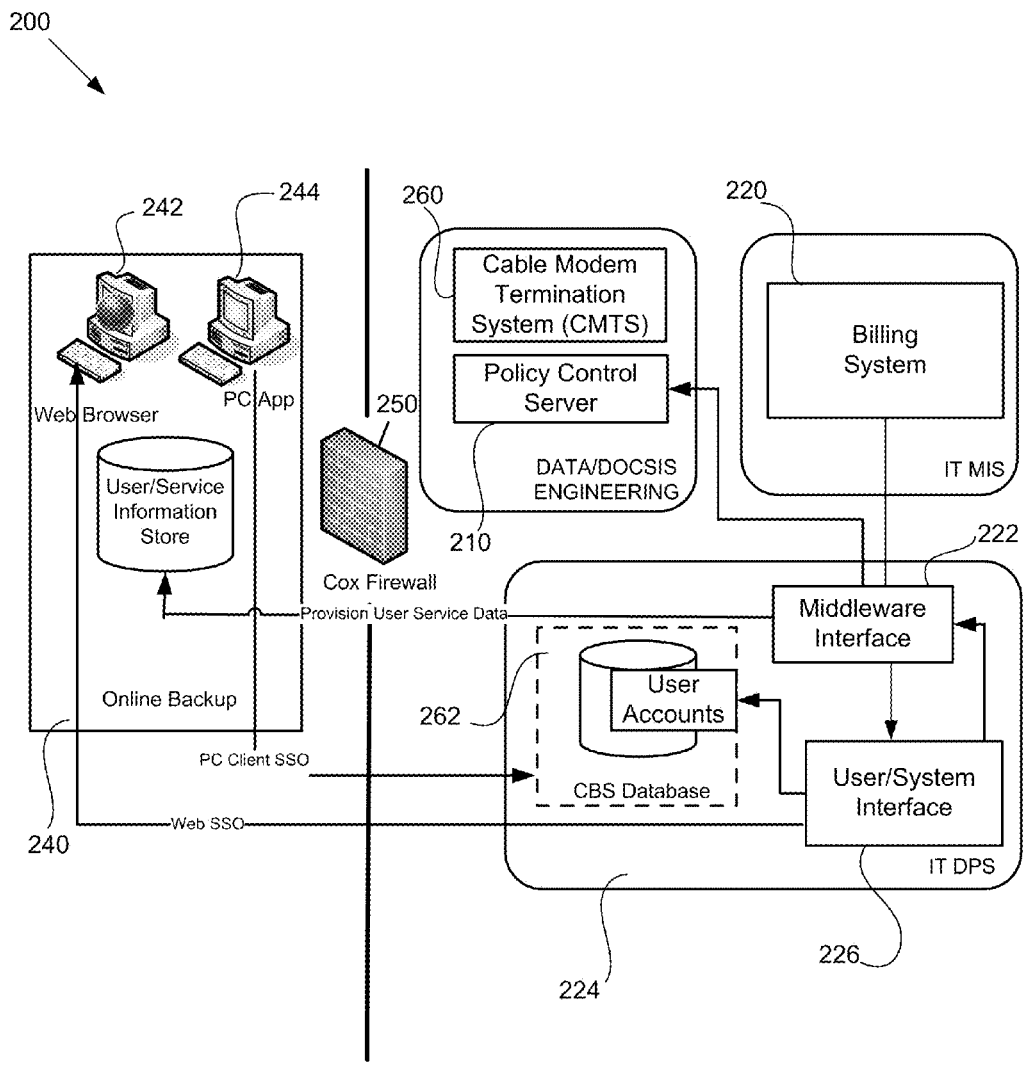
FIG. 2 illustrates a simplified block diagram of an online storage architecture according to an embodiment of the invention.

FIG. 2 illustrates a simplified block diagram of an online storage architecture 200 according to an embodiment of the invention. The online storage architecture 200 provides a service that delivers a secure, secondary level of data backup and file storage for a user in a communications service network. Data is backed-up or stored from a primary source of a user, such as a PC or server. A communications network provider may provide differing service levels of storage via the online storage architecture 200. Additionally, the online storage architecture 200 may offered a discrete, subscription based, stand alone service where greater blocks of backup and file storage capacity, e.g., measured in gigabytes, can be used to drive incremental revenue from the existing base of bandwidth only subscribers. Further, newly bundled subscribers that require additional backup and file storage capacity may expand their service.

A billing system 220 provides to the middleware interface 222 a service code associated with online storage for a user. The middleware interface 222 acts as a gateway between all other systems in the online storage architecture 200. The middleware interface 222 informs the user that the user is allowed X gigabytes of storage and how to activate the online storage. The middleware interface 222 also provides data identifying the user and the amount of storage associated with the user to the policy server 230. The policy server 230 controls allocated bandwidth for data transfers between the user and the online backup 240. The policy server 230 allocates bandwidth on demand according to a policy governing bandwidth subscribed to by the user. A user/system interface 226 is coupled to the middleware interface 222, the customer records database 262 and the online storage 240

A firewall 250 is shown disposed between the online storage 240 and the other network components. A web browser 242 or a personal computer 244 may be used to configure storage backup services. A computer providing a web browser may also be coupled to a data modem, e.g., a cable modem. Data may thus be transferred between the user and the online storage system 240 via the cable modem termination system (CMTS) 260. The CMTS 260 is coupled to the policy server 230. A database 262 stores users' account information for allocating online storage and bandwidth. The online storage 240 is coupled to the middleware interface 222.

Once a customer's account is entered in the billing system 220, information is forwarded to a customer management tool 224, and simultaneously to the storage system 240. The storage system 240 may be provided by an internal or third party vendor. Regardless, the vendor provisions the amount of storage that was ordered. The backup client is downloaded to the desktop of the user via the CMTS 260 and the user begins initiating automatic backups. When a user initiates a storage backup, all of the traffic is routed through a bandwidth on demand policy server 230. When the policy server 230 recognizes that an upload has taken place to that data center 240, it will identify the policy to enforce and enable the appropriate use of bandwidth available to the user. Any increase or boost in bandwidth for data transfer applies not only for every upload, but also for the duration of every upload. Different service levels may be provided for different storage provisions and bandwidth combinations.

Furthermore, use of the online storage service provided by online storage architecture 200 helps customers document compliance with various industry and regulatory guidelines pertaining to the availability and maintenance of data Inherent remote drive and file sharing capabilities also promote and facilitate collaboration between the employees, vendors, and customers without requiring the skill set, time, risk, or cost of implementing and managing local file servers and complex network configurations.

Online storage is a critical service that a customer can grow with while providing incremental revenue and customer loyalty and retention opportunities to a communications network provider. Moreover, online storage services have the potential to cause users to become very dependent, very quickly on the services of the communications network provider. Immediate gains in security, compliance, productivity, and overall collaboration with their employees, vendors, and their own customers make for an easy decision tree supporting bandwidth upgrades to provide greater remote access throughput, storage capacity upgrades to handle more storage and greater collaboration, contract renewals, and new business referrals to vendors and customers they collaborate with. While capturing the attention of and in many cases renewing the attention of formers, current subscribers, and new prospects, online storage presents a solid opportunity to drive increases in revenues, customer retention and new subscriber acquisitions.

Figure 3:
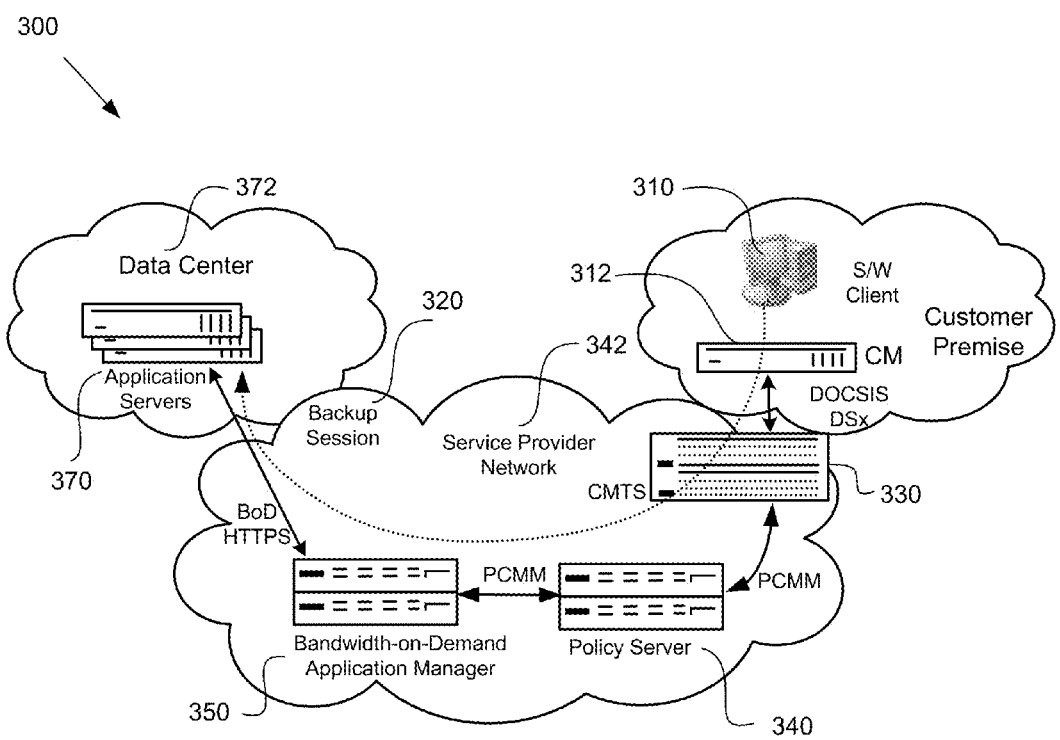
FIG. 3 illustrates a diagram of a network for providing online storage according to an embodiment of the invention.

FIG. 3 illustrates a diagram of a network 300 for providing online storage according to an embodiment of the invention. In FIG. 3, a PC 310 of a customer is shown coupled to a cable modem (CM) 312. An upload/backup session 320 is represented flowing from the PC 310 of the customer to application servers 370 at the data center 372. The data is routed through the cable modem 312, and then through the cable modem termination system (CMTS) 330, which is the cable network in the field. The CMTS signals a storage provider, for example, represented as data center 372, that an upload is taking place so that additional bandwidth may be allocated to the user performing the upload.

The CMTS 330 signals a policy server 340 that an upload is occurring. The policy server 340 may actually be located at the data center 372 or at the service provider network 342. The policy server 340 communicates with a bandwidth-on-demand (BoD) application manager (AM) 350. The BoD AM 350 routes data to storage devices controlled by application servers 370.

The application servers 370 may also recognize the upload instead of being informed of the upload. The application servers 370 may recognize a session and communicate to the policy server 340 to allocate additional bandwidth to the user. Once the data had been uploaded to the storage device, the data may be accessed from any Internet browser. However, to receive the benefit of bandwidth boost and to take advantage of the in-network advantages, the user must be communicating through the cable modem 312.

Figure 4:
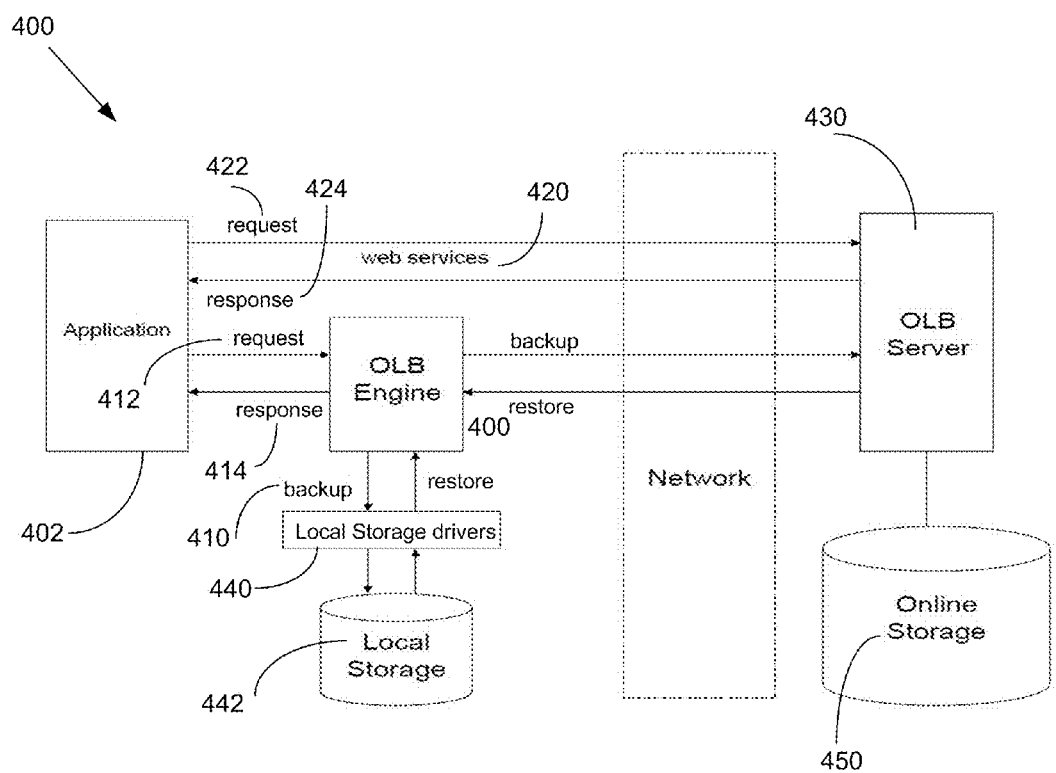
FIG. 4 is a diagram of the network data flow between an application and online storage according to an embodiment of the invention.

FIG. 4 is a diagram 400 of the flow of network data between an application and online storage according to an embodiment of the invention. The storage system includes a backup restore subsystem 410 and web services 420. An application 402 may make a request 422 via web services 420 to the online backup (OLB) server 430. The online backup (OLB) server 430 provides a response 424 to the web services request 422. The user runs a client that invokes the web interface to perform a restore operation. The web services 420 also facilitates comprehensive management of accounts, such as creation, upgrade and downgrade.

An application 402 may also provide a request 412 to the online backup (OLB) engine 430. The online backup (OLB) engine 430 communicates with local storage drivers 440 to facilitate local storage 442 for backup and restore operations. The online backup (OLB) engine 430 also communicates with the online backup (OLB) server 450 for online storage 450.

Figure 5:
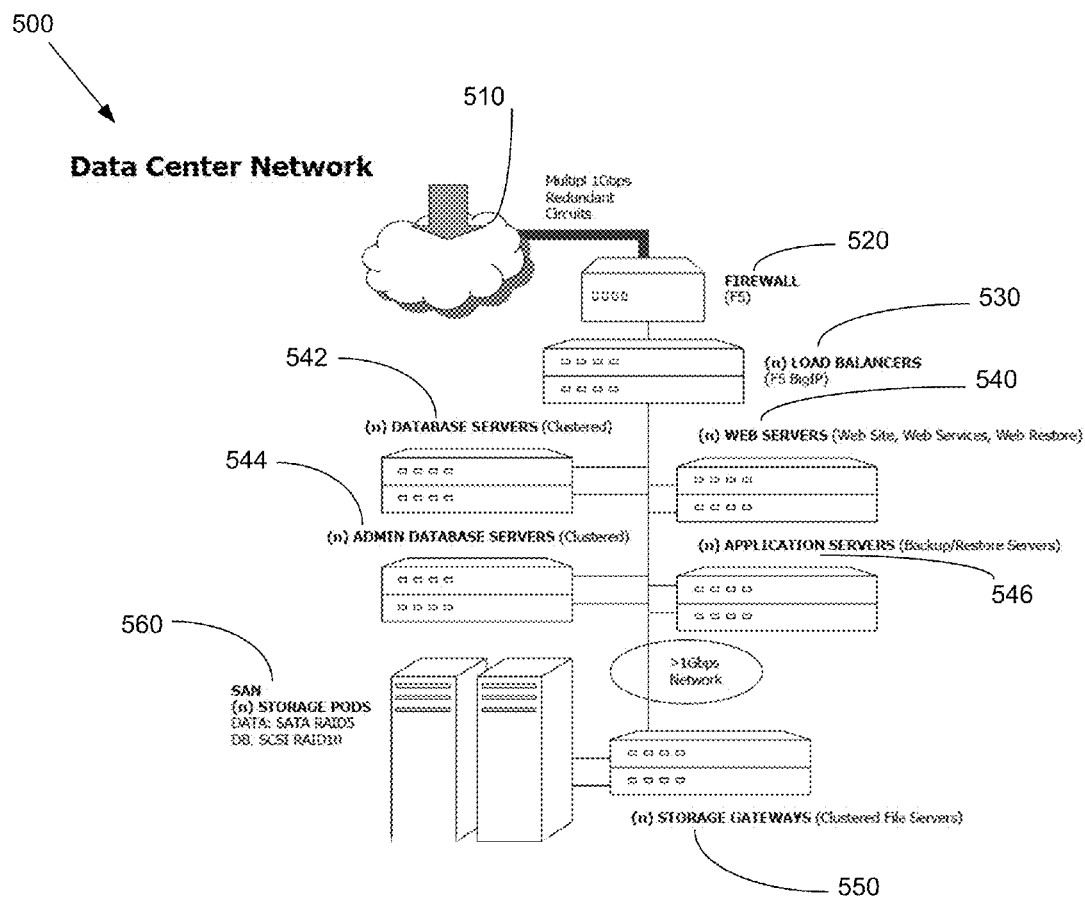
FIG. 5 is a simplified diagram of a data center network according to an embodiment of the invention.

FIG. 5 is a simplified diagram of a data center network 500 according to an embodiment of the invention. In FIG. 5, data from the network 510 traverses a firewall 520 at the data center. Load balancers 530 are coupled to the firewall 520 to allow balancing of loads between different storage systems. As shown in FIG. 5, the data center may include web servers 540, database servers 542, administration database servers 544, application servers 546, etc. In addition, the data center 500 may include storage gateways 550 providing clustered file servers that further communicate with storage systems 560, such as storage area networks.

Figure 6:
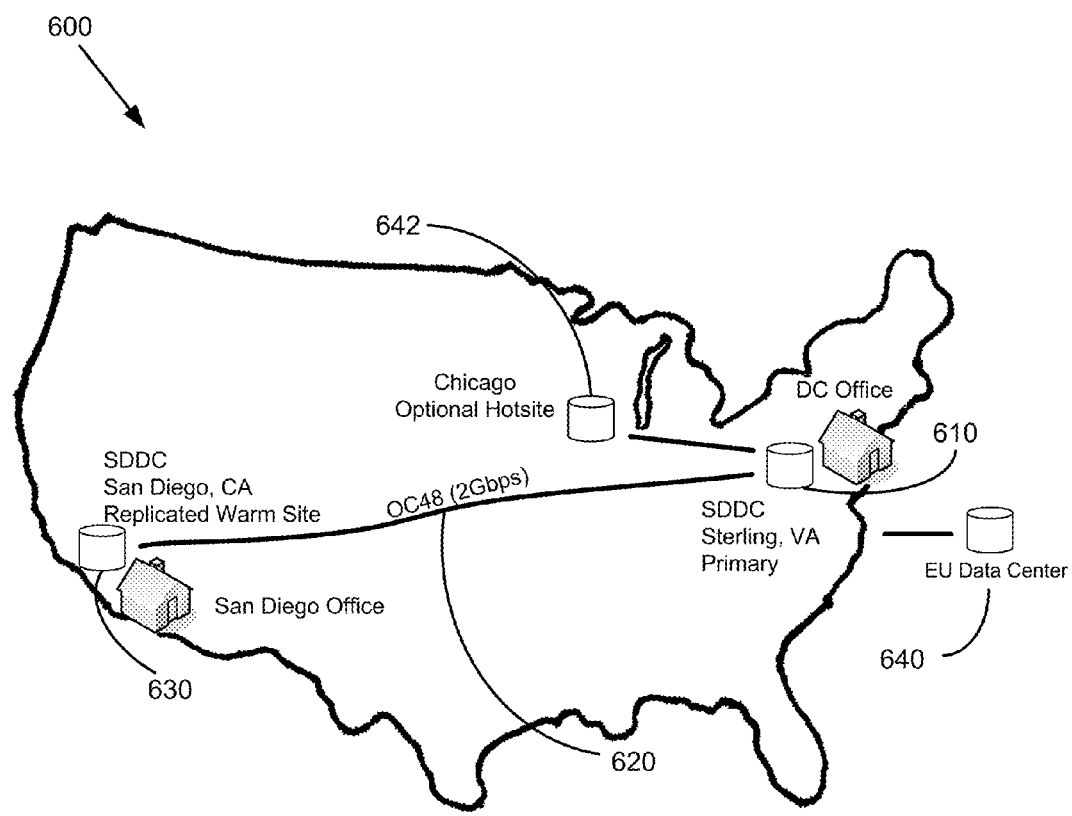
FIG. 6 is a map that demonstrates the geographic redundancy of data centers according to an embodiment of the invention.

FIG. 6 is a map that demonstrates the geographic redundancy of data centers 600 according to an embodiment of the invention. In FIG. 6, a primary data center 610 may be physically located at a first location, e.g., in Sterling, Va. A connection 620 may link another data center 630, e.g., in San Diego, Calif. Thus, two locations 610, 630 are linked for failover so that all the data will be automatically routed to the other location 630 if there is a fault or disaster in the first location 610. The connection 620 may be provided via an optical carrier, e.g., OC48 providing transmission speeds of up to 2488.32 Mbps. Such connections 620 are used as the backbones of many regional Internet Service Providers (ISPs). Thus, these types of connections 620 would ordinarily be part of the Internet cloud However, instead of using the Internet connection and thus riding over the public Internet, an in-network connection may be made available at, for example, the first location 610. Thus, the data uploaded to the online storage at the first location 610 would stay in-network instead of traveling the Internet cloud. Additional data centers, such as European Union data center 640, Chicago data center 642, etc., may also be provided.

Figure 7:
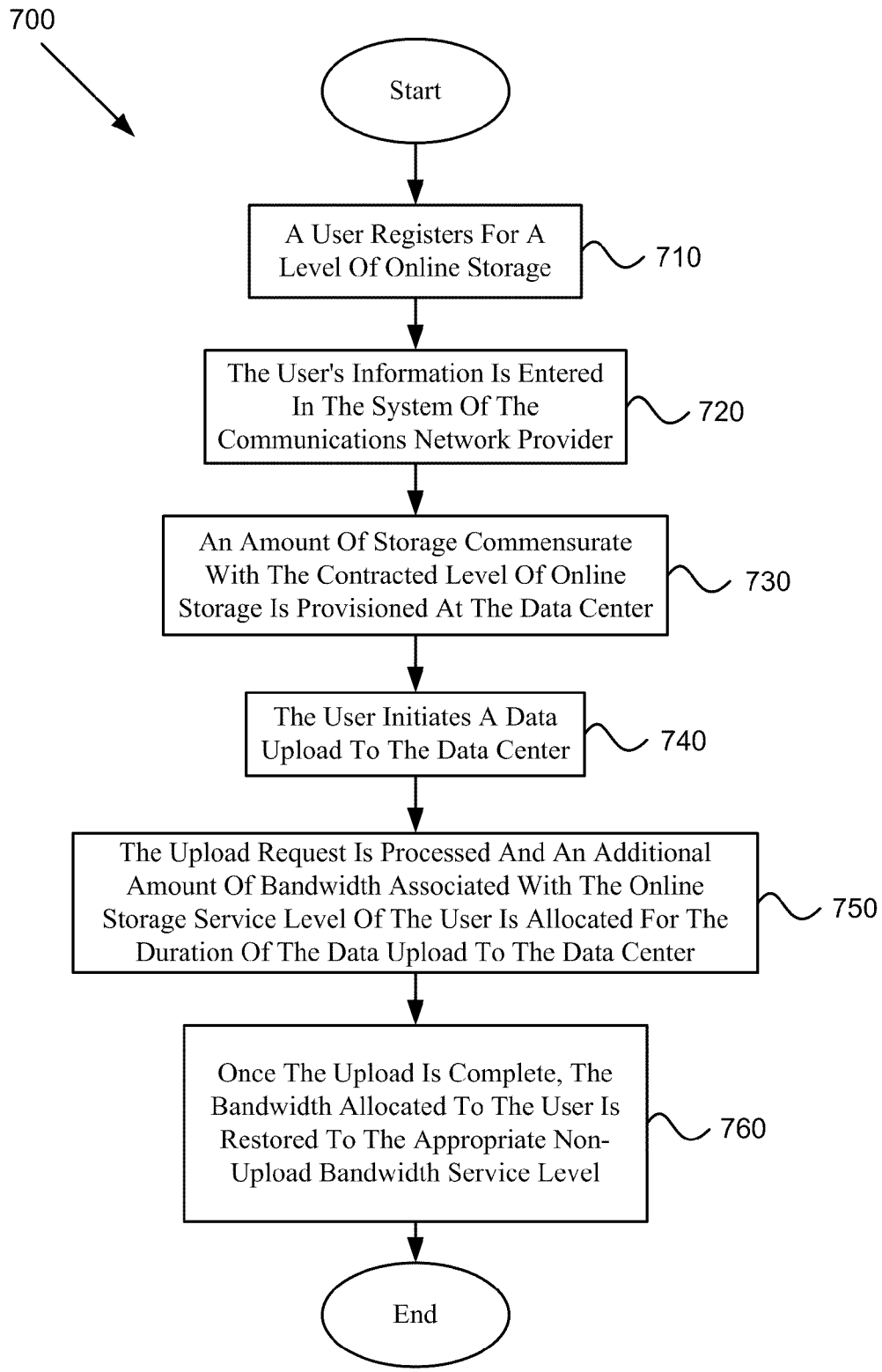
FIG. 7 is a flow chart of a method for providing in-network online storage with increased session bandwidth according to an embodiment of the invention.

FIG. 7 is a flow chart 700 of a method for providing in-network online storage with increased session bandwidth according to an embodiment of the invention. In FIG. 7, a user registers for a level of online storage 710. The user's information is entered in the system of the communications network provider 720. An amount of storage commensurate with the contracted level of online storage is provisioned at the data center 730. The user initiates a data upload to the data center 740. The upload request is processed and an additional amount of bandwidth associated with the online storage service level of the user is allocated for the duration of the data upload to the data center 750. Once the upload is complete, the bandwidth allocated to the user is restored to the appropriate non-upload bandwidth service level 760.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing online storage, comprising:
   performing operations of a user at a standard bandwidth on a network of a communications network provider;
   defining a secure private communications network between a data center and the user of the network of the communications network provider when the user requests to upload data to a online storage at the data center, the secure private communication network having a secure connection for accessing the data center to remotely store data for the user;
   identifying the user requesting initiation of a data upload to the online storage at the data center across the secure private communications network, wherein the online storage at the data center maintains a provisioned amount of the online storage for the registered user;
   based on identification of the user requesting initiation of the data upload to the online storage at the data center through only the secure private communications network, determining a policy associated with the user for bandwidth allocation based on a contracted service level agreement with the user dictating the provisioned amount of online storage available to the user, the standard bandwidth, and a bandwidth boost for uploads across the private network to the provisioned amount of online storage; and in response to receiving an upload request to the provisioned amount of online storage by the user through only the secure private communications network, allocating the bandwidth boost for the requested data upload across the secure private communication network with the secure connection to the online storage at the data center according to the determined policy associated with the contracted service level agreement with the user and restoring the bandwidth provided to the user to the standard bandwidth on the network of the communication network provider once the upload across the secure private communication network is complete.

2. The method of claim 1, further comprising: registering a user for the provisioned amount of online storage; and entering, in a customer management system of a communications network provider, information provided by user during the registering of the user.

3. The method of claim 1, wherein, after the upload to the data center is complete, the bandwidth allocated to the user is restored from the bandwidth boost for uploads to the provisioned amount of online storage to the standard bandwidth.

4. The method of claim 1, wherein the data uploaded to the data center is accessible over a public network without the security, efficiency and increased bandwidth of the bandwidth boost provided by the private communications network.

5. The method of claim 1, wherein identifying a user requesting initiation of a data upload to online storage at a data center comprises authenticating an IP address requesting initiation of a data upload to online storage at a data center.

6. The method of claim 1, wherein the bandwidth boost is provided for the duration of the upload.

7. A system for providing online storage, comprising:
a private communications network established between a user of a network of a communications network provider and a data center provider when the user requests to upload data to a online storage at the data center, the private communication network having a secure connection for accessing an online storage at the data center to remotely store data for the user according to a contracted service level agreement, wherein the online storage at the data center maintains a provisioned amount of the online storage for the registered user;
a policy server, coupled to the network, comprising of a hardware processor coupled to a memory wherein the memory includes instructions that are executed by the hardware processor, for managing services provided to the user of the secure communications network, for identifying the user requesting initiation of a data upload to online storage at the data center, and for controlling allocation of bandwidth to the user according to the contracted service level agreement;
wherein the policy server, based on identification of the user requesting initiation of the data upload to the online storage at the data center, determines a policy associated with the user for bandwidth allocation based on the contracted service level agreement with the user, wherein the contracted service level agreement dictates the provisioned amount of online storage available to the user, a standard bandwidth, and a bandwidth boost for uploads across the private network to the provisioned amount of online storage; and
wherein in response to receiving an upload request to the provisioned amount of online storage at the data center by the user, the policy server allocates the bandwidth boost for the requested data upload across only the private communications network with the secure connection to the online storage at the data center according to the determined policy associated with the contracted service level agreement with the user and restores the bandwidth provided to the user to the standard bandwidth on the network of the communication network provider once the upload across the private network is complete.

8. The system of claim 7, wherein the policy server obtains information from a user registered for the provisioned amount of online storage, and enters, in a customer management system of a communications network provider, the obtained information from a user registered for the provisioned amount of online storage.

9. The system of claim 7, wherein, after the upload to the data center is complete, the policy server restores bandwidth allocated to the user from the bandwidth boost for uploads to the provisioned amount of online storage to the standard bandwidth.

10. The method of claim 7, wherein the data center provides access to the data uploaded to the data center over a public network without the security, efficiency and increased bandwidth of the bandwidth boost provided by the private communications network.

11. The system of claim 7, wherein identification of the user requesting initiation of the data upload to the online storage at the data center comprises identification of an IP address requesting initiation of a data upload to online storage at a data center.

12. The system of claim 7, wherein the bandwidth boost is provided for the duration of the upload.

13. A computer readable storage device including executable instructions which, when executed by a hardware processor, provides online storage, by:
performing operations of a user at a standard bandwidth on a network of a communications network provider;
defining a secure private communications network between a data center and the user of the network of the communications network provider when the user requests to upload data to a online storage at the data center, the secure private communication network having a secure connection for accessing the data center to remotely store data for the user;
identifying the user requesting initiation of a data upload to the online storage at the data center across the secure private communications network, wherein the online storage at the data center maintains a provisioned amount of the online storage for the registered user;
based on identification of the user requesting initiation of the data upload to the online storage at the data center through only the secure private communications network, determining a policy associated with the user for bandwidth allocation based on a contracted service level agreement with the user dictating the provisioned amount of online storage available to the user, the standard bandwidth, and a bandwidth boost for uploads across the private network to the provisioned amount of online storage; and
in response to receiving an upload request to the provisioned amount of online storage by the user through only the secure private communications network, allocating the bandwidth boost for the requested data upload across the secure private communication network with the secure connection to the online storage at the data center according to the determined policy associated with the contracted service level agreement with the user and restoring the bandwidth provided to the user to the standard bandwidth on the network of the communication network provider once the upload across the secure private communication network is complete.

14. The computer readable storage device of claim 13, further comprising: registering a user for the provisioned amount of online storage; and entering, in a customer management system of a communications network provider, information provided by user during the registering of the user.

15. The computer readable storage device of claim 13, wherein, after the upload to the data center is complete, the bandwidth allocated to the user is restored from the bandwidth boost for uploads to the provisioned amount of online storage to the standard bandwidth.

16. The computer readable storage device of claim 13, wherein the data uploaded to the data center is accessible over a public network without the security, efficiency and increased bandwidth of the bandwidth boost provided by the private communications network.

17. The computer readable storage device of claim 13, wherein identifying a user requesting initiation of a data upload to online storage at a data center comprises authenticating an IP address requesting initiation of a data upload to online storage at a data center.

18. The computer readable storage device of claim 13, wherein the bandwidth boost is provided for the duration of the upload.

* * * * *